United States Patent
Gusack et al.

(10) Patent No.: US 6,312,629 B1
(45) Date of Patent: Nov. 6, 2001

(54) APPARATUS AND METHOD FOR PRESSING POWDERS

(75) Inventors: James A. Gusack, Williamsburg; Mark D. Lowell, Gloucester, both of VA (US); Philip Kneisl, Pearland, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/497,875

(22) Filed: Feb. 4, 2000

(51) Int. Cl.$^7$ ................ B28B 3/08; B29C 31/06
(52) U.S. Cl. .............. 264/37.29; 264/40.4; 264/109; 425/140; 425/148; 425/352; 425/447; 425/260; 425/405.1
(58) Field of Search .................. 264/40.4, 109, 264/122, 37.29, 37.1, 102; 425/78, 140, 148, 352, 354, 355, 406, 447, 449, 162, 256, 260, 405.1

(56) References Cited

U.S. PATENT DOCUMENTS

| | | | |
|---|---|---|---|
| 2,338,491 | * 1/1944 | Cutler | 425/140 |
| 2,664,557 | * 12/1953 | Sargrove | 425/148 |
| 3,266,096 | * 8/1966 | Thomas et al. | 425/148 |
| 4,142,847 | * 3/1979 | Ripani | 425/148 |
| 4,771,836 | 9/1988 | Naito et al. . | |
| 4,843,579 | 6/1989 | Andrews et al. . | |
| 5,005,657 | 4/1991 | Ellion et al. . | |
| 5,074,774 | * 12/1991 | Nose et al. | 264/40.4 |
| 5,114,630 | 5/1992 | Newman et al. . | |
| 5,213,724 | * 5/1993 | Saatkamp | 264/40.4 |
| 5,387,095 | 2/1995 | Mahony et al. . | |

\* cited by examiner

*Primary Examiner*—Mathieu D. Vargot
(74) *Attorney, Agent, or Firm*—Mark Homer

(57) ABSTRACT

The present invention provides a method and apparatus for providing zero-defect pressed articles with minimal, remote operator intervention. The apparatus includes a programmable logic controller, controlling a powder feeder portion having a dump bucket which is weighed by an electronic scale. Desired weights of powder in the dump bucket are dumped to a first location and conveyed to the press. Non-desired weights of powder in the dump bucket are dumped to a second location and may be recycled. The invention provides for precise weighing of powder and avoids waste of powder in the event of improper powder dispensing and provides for complete automatic logging of production and testing data, and rejection of defective articles, avoiding the need to manually test each produced article. This method and apparatus are particularly useful in the pressing of energetic materials into pellets or casings, where manual operations are restricted for safety reasons.

38 Claims, 8 Drawing Sheets

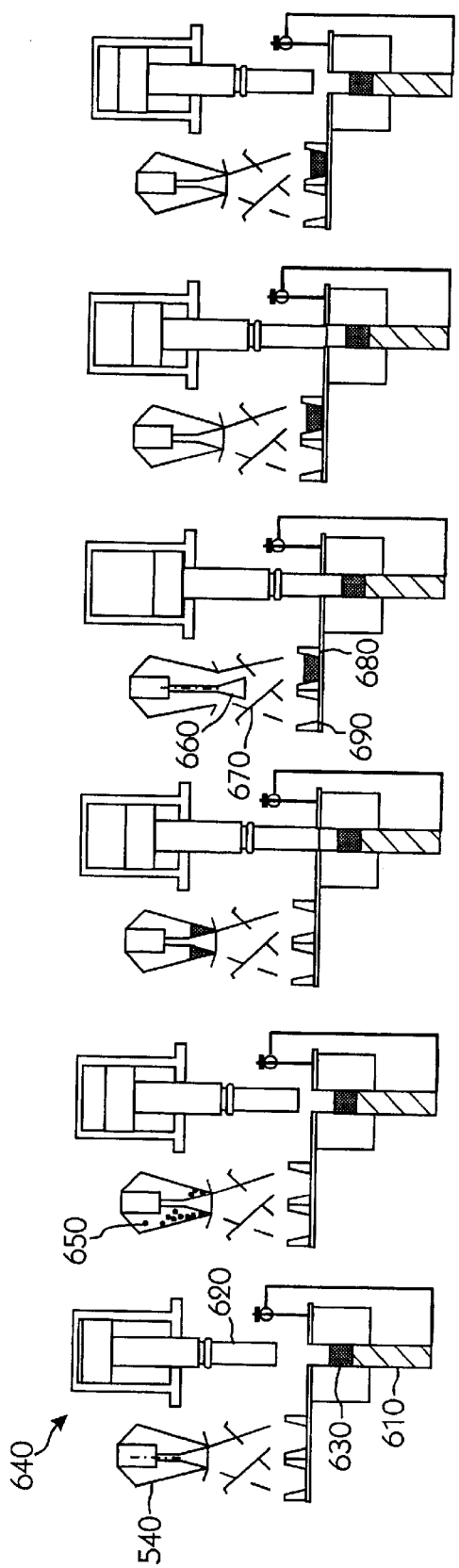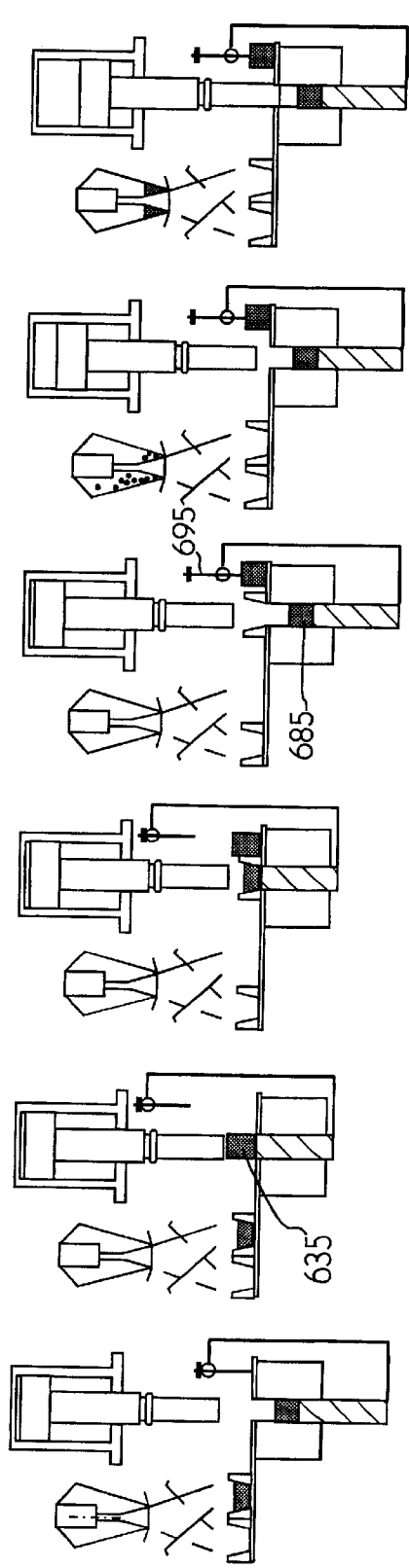

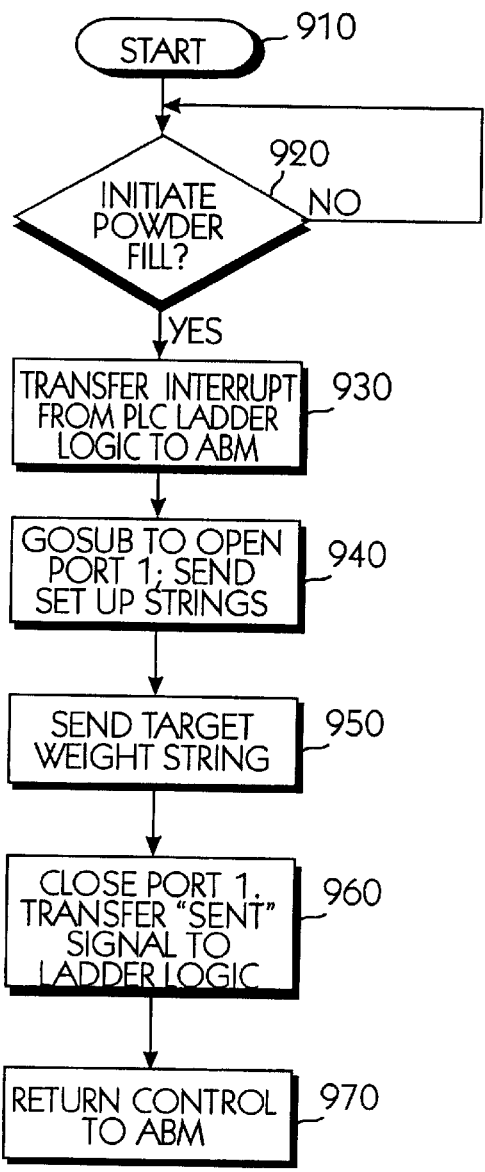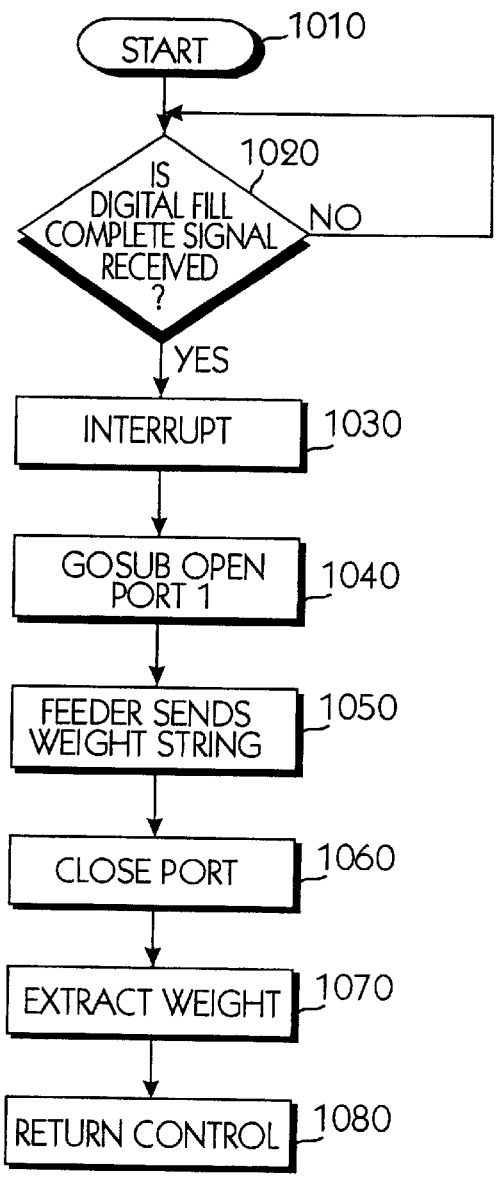
Fig. 9
Fig. 10

APPARATUS AND METHOD FOR PRESSING POWDERS

BACKGROUND OF THE INVENTION

1. Field of the Invention

The present invention relates to apparatus and methods for pressing powders, and more particularly to the making of ammunition and explosive charges.

2. Description of the Related Art

A variety of articles are prepared by pressing, or consolidating, powders either directly to form pellets, or into casings. In particular, the pressing of powders made from energetic materials to make explosive pellets or to fill projectile casings is associated with a number of problems.

A typical procedure for pressing energetic materials involves a large number of manual steps, many associated with safety issues of the pressing of energetic materials. The process requires manual weighing of powder, manual filling of a die or case, consolidating the powder, and manually performing off-line control testing.

When automatic filling is performed based on volume of powder, it is common for an improper amount of powder to be added to the die, resulting in a defective product that must be discarded after identification in a post-manufacturing inspection. With an energetic material, disposal of the defective product is a significant issue. Generally, determination of the quality of a produced item can only be determined by inspection after it is produced. In addition, record keeping for such a process is generally performed manually. This is tedious and involves substantial amounts of time after manufacture for correlating the manufactured items with the records.

In addition, improper filling of the die cavity of the press due to delivery of an improper amount of powder may additionally pose a safety issue. For example, too much of an energetic powder could conceivably increase the risk of explosion during the pressing step.

Moreover, the large number of manual steps associated with the process makes the process slow. In particular, it is necessary at several points in the process for the operators to leave the vicinity of the press to a safe room for fear of an explosion during a pressing step. This is tedious and adds considerably to the production time.

Examples of the contemporary art dealing with delivering controlled amounts of material are seen in the following U.S. Pat. No 4,843,579, to Andrews et al., entitled Weighing And Filling Method And Apparatus, describes a method and apparatus for dispensing measured amounts of powdered materials. The apparatus has a vibratory feeder, and deposits powdered material using a feeder trough into a container where it is electronically weighed.

U.S. Pat. No. 4,771,836, to Naito et al., entitled Control For A Weighing System, describes a system for combinational weighing.

U.S. Pat. No. 5,005,657, entitled Powder Dispensing and Measuring Device, describes an apparatus with a vibrating barrel for transferring powder, and a scale for weighing the discharged powder.

U.S. Pat. No. 5,114,630, entitled Continuous Manufacture And Casting, describes a system for manufacturing fluid products, particularly highly filled materials.

U.S. Pat. No. 5,387,095, entitled An Apparatus For Injection Molding High-Viscosity Materials, describes an apparatus for injection molding highly viscous materials. The apparatus is not designed for the handling of powders, however.

None of the above patents deals specifically with the issues of delivering weighed powder to a press.

SUMMARY OF THE INVENTION

It is therefore an object of the present invention to provide an improved method and apparatus for pressing (consolidating) powders.

It is also an object of the invention to provide an apparatus and method allowing better quality control of pressed powder articles.

It is a further object of the invention to provide an apparatus and method for avoiding waste of the powder material.

A yet further object of the invention is to provide an apparatus and method allowing data logging of the production parameters for the product.

A still further object of the invention is to provide an improved apparatus and method for pressing energetic powders.

A still yet further object is to provide an apparatus and method which allow more rapid production of pressed products.

Another object of the invention is to provide an apparatus and method which allows safer pressing of energetic materials.

To achieve the above and other objects, the present invention provides an apparatus having a powder compaction press, a gravimetric feeder for feeding powder to the press, a programmable logic controller (PLC) connected to the press and the gravimetric feeder, for receiving information from and sending information to the press and feeder. The gravimetric feeder includes a powder feeder, a dump bucket and an electronic scale. The gravimetric feeder has means for weighing the dump bucket, and for directing the contents of the dump bucket to the press when a desired amount of powder is in the dump bucket. Moreover, the gravimetric feeder has means for directing the contents of the dump bucket away from the press for recovery or recycling when a non-desired weight of powder is in the bucket. The means for directing the contents of the dump bucket may be an electronically controlled diverter or a moveable chute.

The apparatus of the present invention is controlled by the PLC. In addition, the control of the present invention includes solenoid valves which operate press cylinders, located in a hazard area. The PLC is also connected to a feeder controller operating the powder feeder in the hazard area, and to a scale controller receiving data from the projectile scale in the hazard area. The PLC is also connected to a dump controller and pneumatic controls, which in turn control door operation, a chute activator, and a dump bucket. The PLC also receives pneumatic signals from the press. Scale controls and press electronic sensors are also connected to the PLC. The PLC is further connected through a switch (SW) to a personal computer (PC) for automatic, time-stamped data logging.

The present invention also encompasses a method of preparing pressed articles. The method of the present invention includes the steps of: feeding powder to a bucket; weighing the bucket using an electronic scale; determining if the weight of powder in the bucket is a desired weight; and if the weight of powder is a desired weight, then dumping the powder to a first location, and if the weight of powder in the bucket is an undesirable weight, dumping the powder to a second location; conveying the powder from the first location to a press and pressing the powder; obtaining pressing parameter data, conveying the pressed powder article from the press, and storing the pressing parameter data. The pressing parameters may include hydraulic pressure, temperature and ram height.

The powder dumped to the second location may be returned to a hopper to be fed again to the bucket. The dumping of powder to a first location may entail dumping the powder to a shoe which will be moved to the die cavity of the press, or to a chute which may be directed to a casing to be filled. The pressing may be performed with an opposed-ram press, and the movement of the shoe over the die cavity may be used to convey a previously pressed article from the press. Additional steps may include post-pressing inspection of the article and automatic diversion of an unacceptable article, as well as labeling, packaging and warehousing of the article.

The method of the present invention may be carried out using the apparatus of the present invention, under control of the PLC.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein:

FIGS. 6A to 6L are a series of views illustrating the operation of the apparatus of the present invention;

FIG. 9 is a flow diagram illustrating an operation according to an embodiment of the present invention; and FIG. 10 is a flow diagram illustrating an operation according to an embodiment of the present invention.

DETAILED DESCRIPTION OF THE INVENTION

Figure 1:
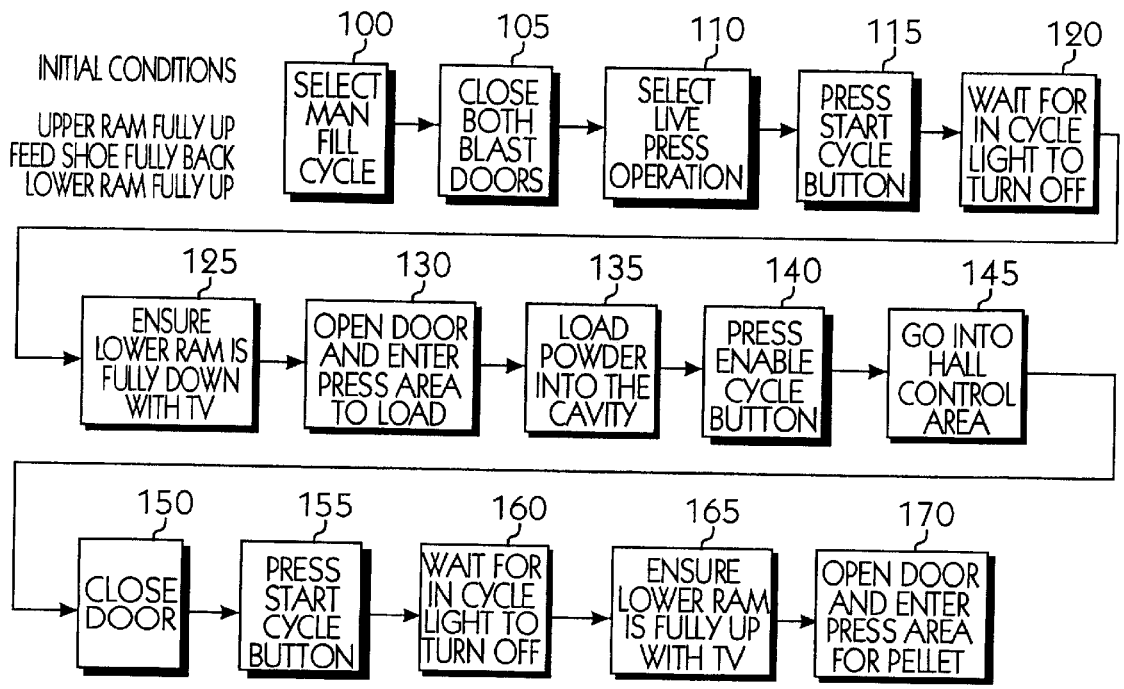
FIG. 1 is a flow chart of an earlier, manual method of consolidating a powder of an energetic material.
Figure 2:
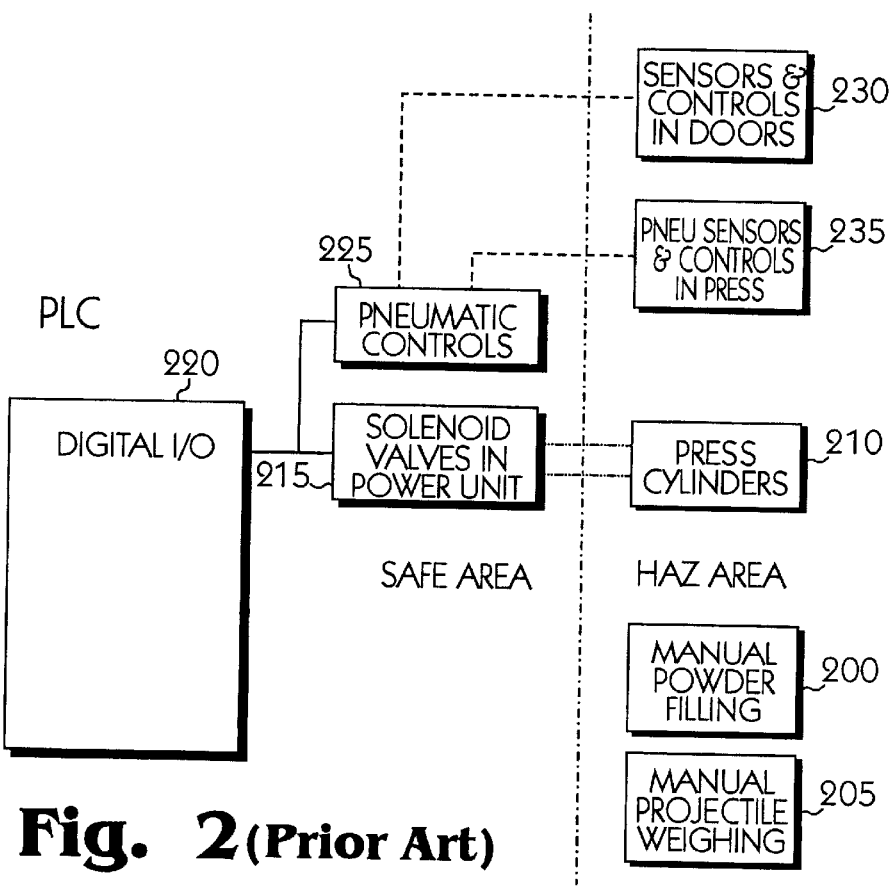
FIG. 2 is a schematic of the press control for the earlier apparatus for use with the method of FIG. 1.

An existing method of operating a press involving the filling of energetic materials is shown in FIG. 1, and a schematic of the control of such a manual press is shown in FIG. 2. As can be seen in FIG. 2, the press control involves separate manual powder filling 200 and manual projectile weighing 205. Press cylinders 210 are operated by solenoid valves 215. The solenoid valves are controlled by PLC 220, which also controls pneumatic controls 225 connected to door sensors and controls in door 230 and pneumatic sensors and controls in press 235. For reasons of safety, PLC 220, solenoid valves 215 and pneumatic controls 225 are placed in a safe area away from the press.

FIG. 1 shows a typical process for operating a press to make pellets of energetic powders. An operator first selects a manual fill cycle in step 100, closes blast doors (step 105), selects live press operation (step 110), presses the start cycle button (step 115), waits for the in cycle light to turn off (step 120), ensures that the lower ram is fully down using remote TV monitoring (step 125), opens the door and enters the press area (step 130), loads powder into the cavity (step 135), presses the enable cycle button (step 140), goes into the hall control area (step 145), closes the door (step 150), presses the start cycle button (step 155), waits for the in cycle light to turn off (step 160), ensures that the lower ram is fully up, therefore ejecting the pellet (step 165), and opens the door and enters the press area to retrieve the pellet (step 170).

The manual steps in this process require the operators to repeatedly enter and leave the vicinity of the press for reasons of safety, enormously slowing down the process. There is no way to determine if the product produced is defective until subsequent testing, and this requires awkward manual record keeping on the products. Attempts to automate the delivery of powder metering by volume have generally led to substantial variation in the amount of powder delivered.

The present invention, which overcomes these problems, will now be described with reference to the Figures. The control apparatus of the present invention is described schematically in FIG. 3.

Figure 3:
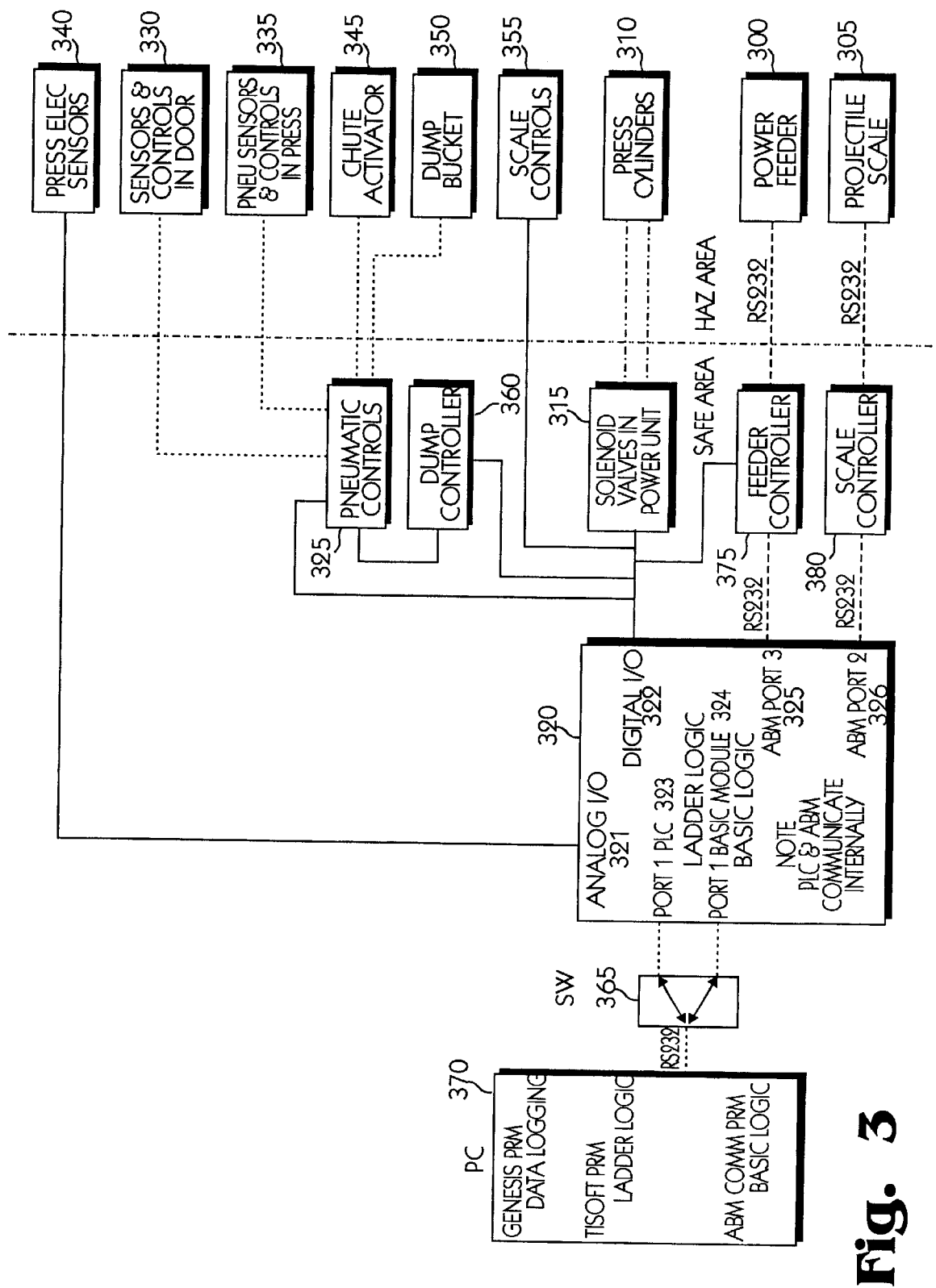
FIG. 3 is a schematic of the press control of the present invention.

In FIG. 3, the present invention includes a PLC 320, located in a safe area, for controlling the overall pressing process. PLC 320 is connected via digital input/output to solenoid valves 315 which operate press cylinders 310, located in the hazard area. PLC 320 is also connected to feeder controller 375 operating powder feeder 300 in the hazard area, and to scale controller 380 receiving data from the projectile scale 305 in the hazard area. PLC 320 is also connected to dump controller 360 and pneumatic controls 325, which in turn control operation of sensors and controls in door 330, press pneumatic signals 335, chute activator 345, and dump bucket 350. Scale controls 355 and press electronic sensors 340 are also connected to PLC 320. PLC 320 is further connected through SW 365 to PC 370, which has memory for storage of time-stamped data including production logs.

PLC 320 communicates with SW 365 through ladder logic controller portion 323 and basic logic portion 324, and to press electronic sensors 340 through analog I/O 321. The ladder logic controller portion is for connecting to the data collection function of the PC, and the basic logic is connected to the feeder controller. PLC 320 communicates with feeder controller 375 and scale controller 380 using RS232 ABM ports 325 and 326. PLC 320 communicates with solenoid valves 315, scale controls 355, dump controller 360, feeder controller 375, and pneumatic controls 325 through digital I/O 322.

Figure 4:
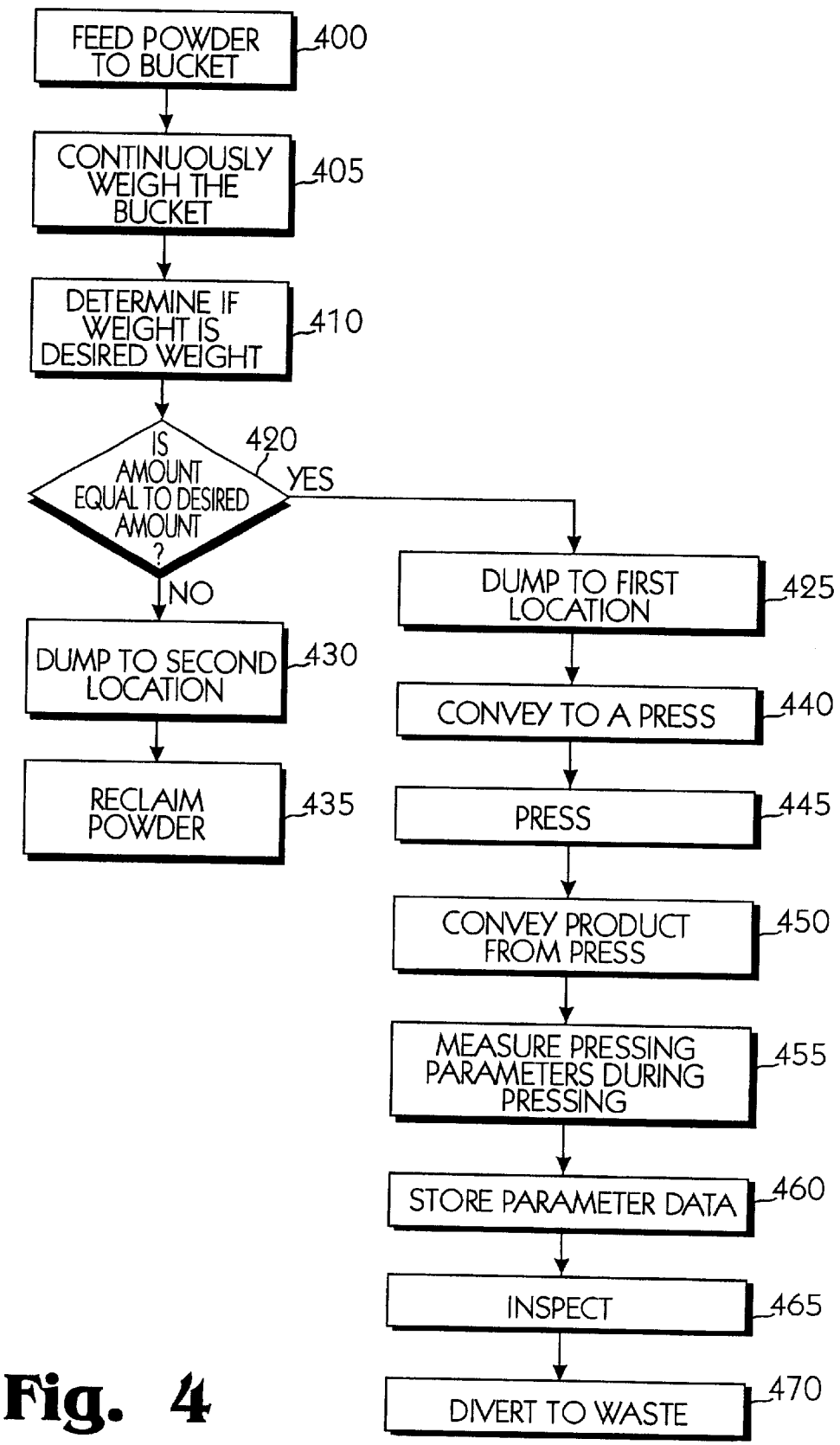
FIG. 4 is a flow chart of a method of consolidating a powder according to the present invention.

A method of pressing a powder according to the present invention is shown schematically in FIG. 4. In step 400, powder from a source such as a hopper is fed to a bucket. This will generally be performed by a conveyor belt or screw thread, and may involve vibratory methods for controlling the flow of the powder, as are known in the art. In step 405, the bucket is continually weighed, to determine how much powder has flowed into it. This will generally be done electronically. In step 410, it is determined if the weight of the bucket has reached a desired weight indicating that the amount of powder in the bucket is within a desired range.

Then, in step 420, if the amount in the bucket is equal to the desired amount, the contents of the bucket are dumped to a first location, in step 425, from where the powder will be conveyed to the press to be pressed. Alternatively, if the amount is not equal to a desired amount, the powder will be dumped to a second location (step 430). The directing of the powder to the first or second locations may be carried out by a number of methods. For example, a diverter may be used below the bucket. The diverter may be actuated to divert to the first or second location before the bucket is dumped. This diverter may be in the form of a chute below the bucket, the chute being positioned with the outlet at the first or second position before dumping.

Generally, a non-desired amount is an overweight of powder, and powder dumped to the second location can be reclaimed in step 435. The reclaiming step may be returning the powder to the hopper to be fed to the bucket in step 400. This may be done during the process by use of a conveyor from the second location to the hopper.

This powder dumped to the first location in step 425 is to be pressed, and the first location may be, for example, a conveyor belt, a casing of a cased article, a shoe to hold powder over the die, or may be the die of the press itself. The powder is accordingly conveyed to a press (step 440), pressed (step 445) and conveyed from the press (450). Pressing (consolidating) step 445 may include additional steps involved with making a pressed article, such as controlling the temperature, evacuating the die, etc. The conveying steps 440 and 450 may be carried out using a conveyor belt or the like.

During the pressing step 445, various pressing parameters are measured (step 455). These parameters may be, for example, the hydraulic pressure, the temperature, and the height of a pressed article, using a height sensing gauge. These measured pressing parameters are stored electronically, in step 460, by methods well known in the art. For example, data may be stored digitally in a computer, on a magnetic disk, etc.

Subsequent to production, the produced pellets may be inspected (step 465) and defective pellets may be diverted to waste (step 470). The inspecting step may include optical measurements, weighing, density and size measurements. Additional steps which may be performed include serial number or time/date stamping, packaging, etc.

The automated steps of the present invention are carried out by a PLC 320 as shown in FIG. 3. As noted, the PLC 320 has means for determining the parameters of the pressing of the powder. Additionally, PLC 320 means may be present for consolidating multiple increments of powder. In such a case, not shown in FIG. 4, after pressing step 445, steps 400, 405, 410, 420, 425 and 440 would be repeated for a second amount of powder, and so on, until a desired number of increments of powder had been consolidated.

Figure 5:
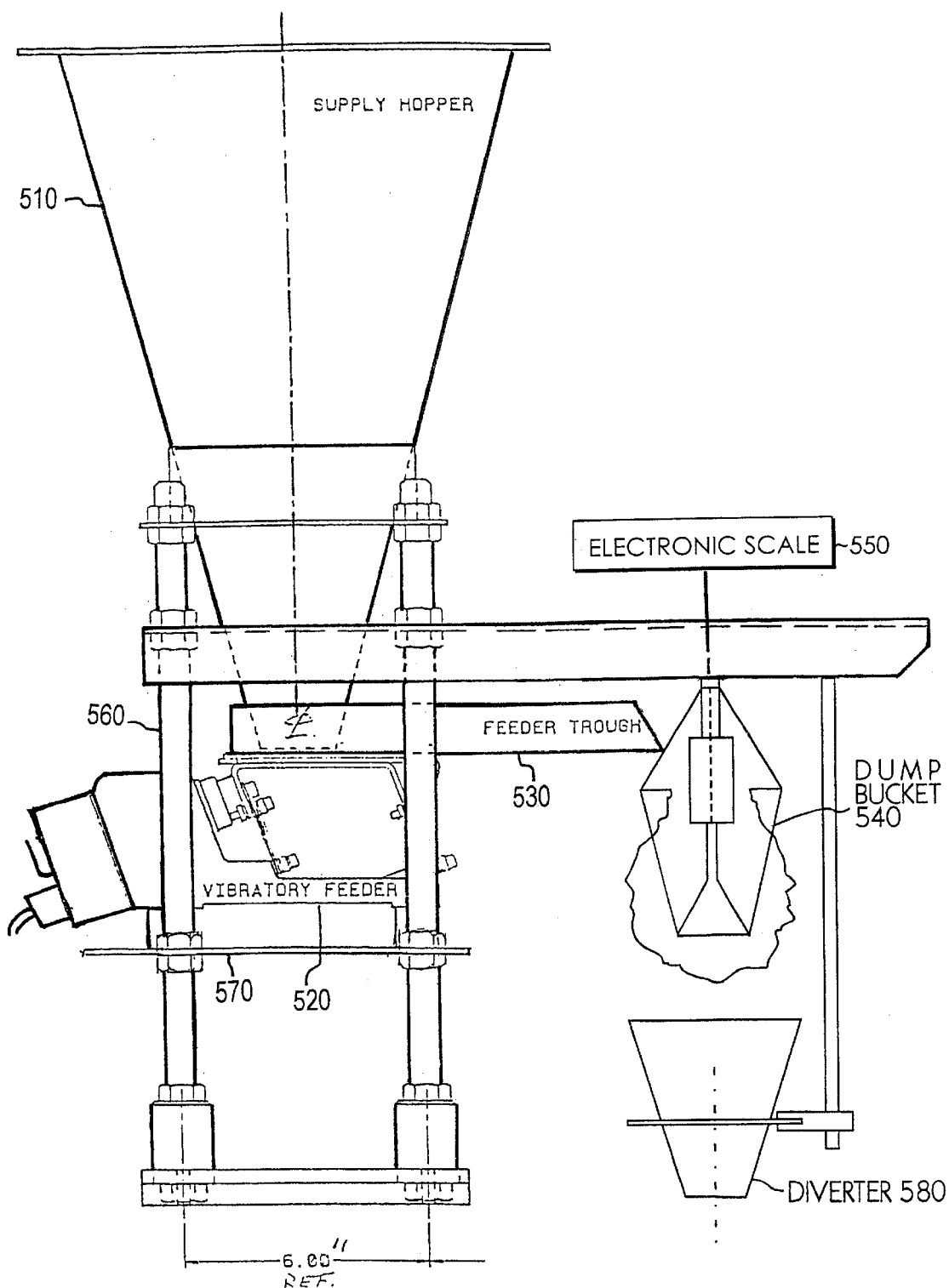
FIG. 5 is an elevational view of a portion of the apparatus of the present invention.

Features of the method and apparatus of the present invention may be seen in greater detail in FIG. 5. FIG. 5 depicts an actual embodiment of the gravimetric feeder portion of the apparatus. The gravimetric feeder includes powder feeder 300 and dump bucket 350 which were indicated schematically in FIG. 3. In FIG. 5, the powder feeder includes supply hopper 510, a 10-liter 30-degree conical electropolished stainless steel hopper with 1.5-inch ID spout, which holds the powder which will be pressed. Vibratory feeder 520, which is electrically actuated, feeds the powder consistently via feeder trough 530, an open feeder trough made of electropolished stainless steel, which transports the powder to dump bucket 540. Supporting this apparatus is support stand 560, a 4-post stand with plate 570 to support the vibratory feeder. The feeder trough feeds dump bucket 540, which has a 30-degree conical funnel with a spout and a pneumatically actuated dump valve inside the conical funnel. An electronic scale 550 attached to the dump bucket weighs the dump bucket and contents. A diverter 580 receives the dumped powder.

Typical operation of the dump bucket 540 and press 640 is shown in FIG. 6. In FIG. 6A, dump bucket 540 is empty, lower ram 610 and upper ram 620 of opposed-ram hydraulic press 640 are retracted, and powder load 630 from a first fill, is in the die cavity above lower ram 610. In FIG. 6B, a second fill starts as powder 650 enters dump bucket 540.

In FIG. 6C, the powder is weighed, and it is determined that the proper amount of powder is present, and upper ram 620 closes off the space above powder load 630. At this point, a vacuum may be applied to powder load 630.

In FIG. 6D, dump valve 660 of dump bucket 540 dumps the powder, and diverter 670 diverts the powder to shoe 680. If the weight of powder had been too great, diverter 670 would have diverted the powder to shoe 690, for recycling. Meanwhile, upper ram 620 compresses powder 630.

In FIG. 6E, vacuum, if applied, is relieved, and upper ram 620 is retracted to the vacuum position. In FIGS. 6F and 6G, upper ram 620 is partially and fully retracted, respectively.

In FIG. 6H, lower ram 610 is raised to bring pellet 635, which resulted from powder load 630, to surface level. In FIG. 6I, shoe 680 is moved into position above lower ram 630, moving pellet 635 aside. In FIG. 6J, lower ram 610 retracts, drawing in powder load 685 to the die cavity. Also, first pellet 635 is measured by height-sensing gauge 695.

FIGS. 6K and 6L are analogous to FIGS. 6B and 6C, as a third fill begins. The cycle can be repeatedly indefinitely, producing a succession of pellets.

An apparatus of the present invention may also include well known elements not shown in the drawings. For example, a vacuum pump may be used for the evacuation of the die cavity before pressing. A labeling unit for labeling the products with serial number or time/date stamp may be present. Heating and cooling apparatus in the die cavity may be present. A conveyor belt with a diverter may be present for directing the finished pellets. A packaging machine and a collector for warehousing may be used. A display control panel for operator control of the apparatus may be present. Sensors may be present for safety interlock. Moreover, the data logging function of PC 370 may take any conventional form, such as a magnetic storage medium.

Figures 7A, 7B:
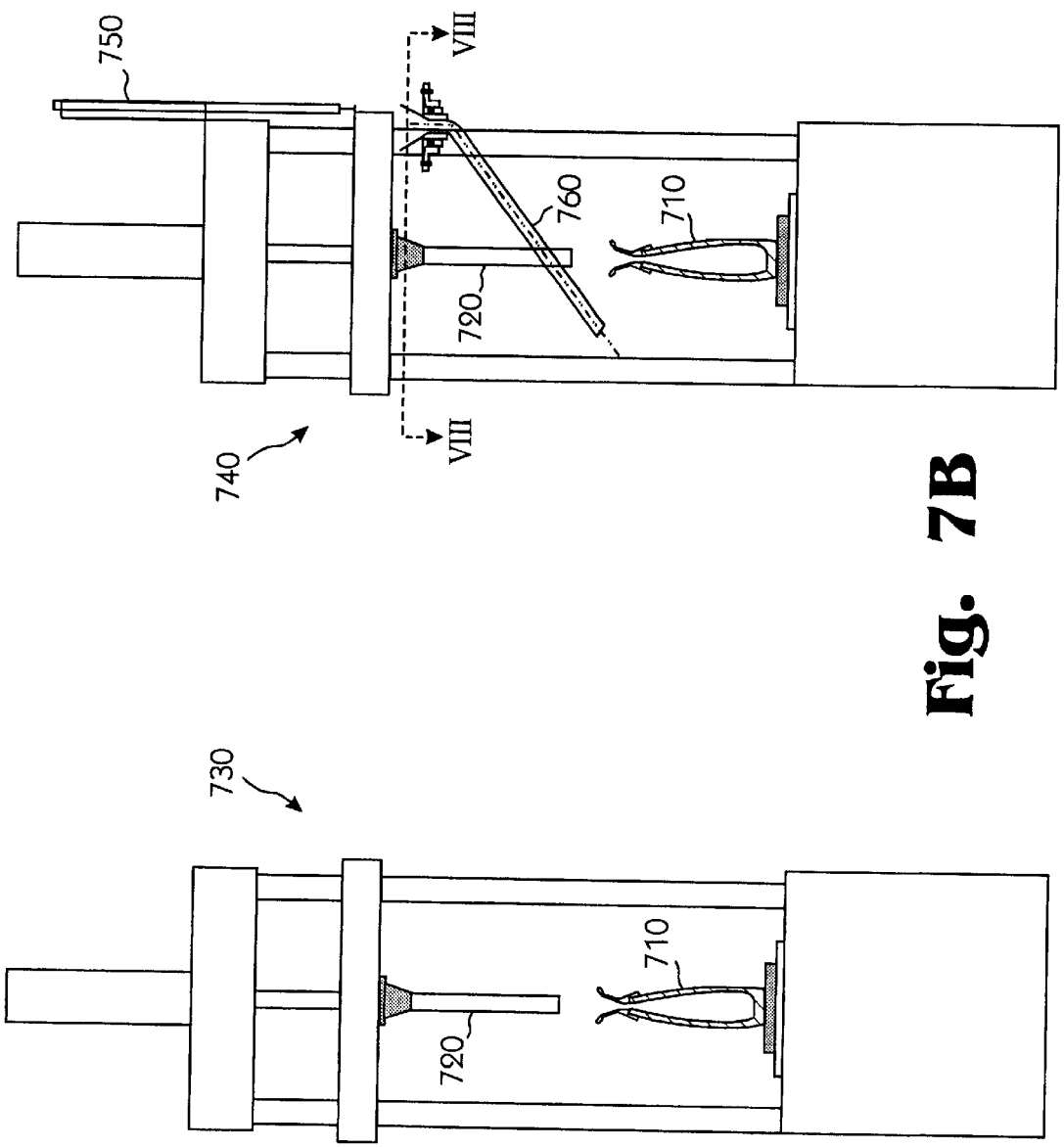
FIGS. 7A and B are, respectively, elevational views of an earlier press for consolidation of a powder in a projectile and an embodiment of the present invention.

FIG. 7A illustrates a previously used press apparatus for filling a projectile casing with a powder charge, and FIG. 7B illustrates an embodiment of the present invention for performing this function. In FIG. 7A, the previously used press 730 may be seen to have projectile casing 710 and ram 720. Casing 710 would be manually filled with powder, and then placed in press 730 for consolidation by ram 720.

Figure 8:
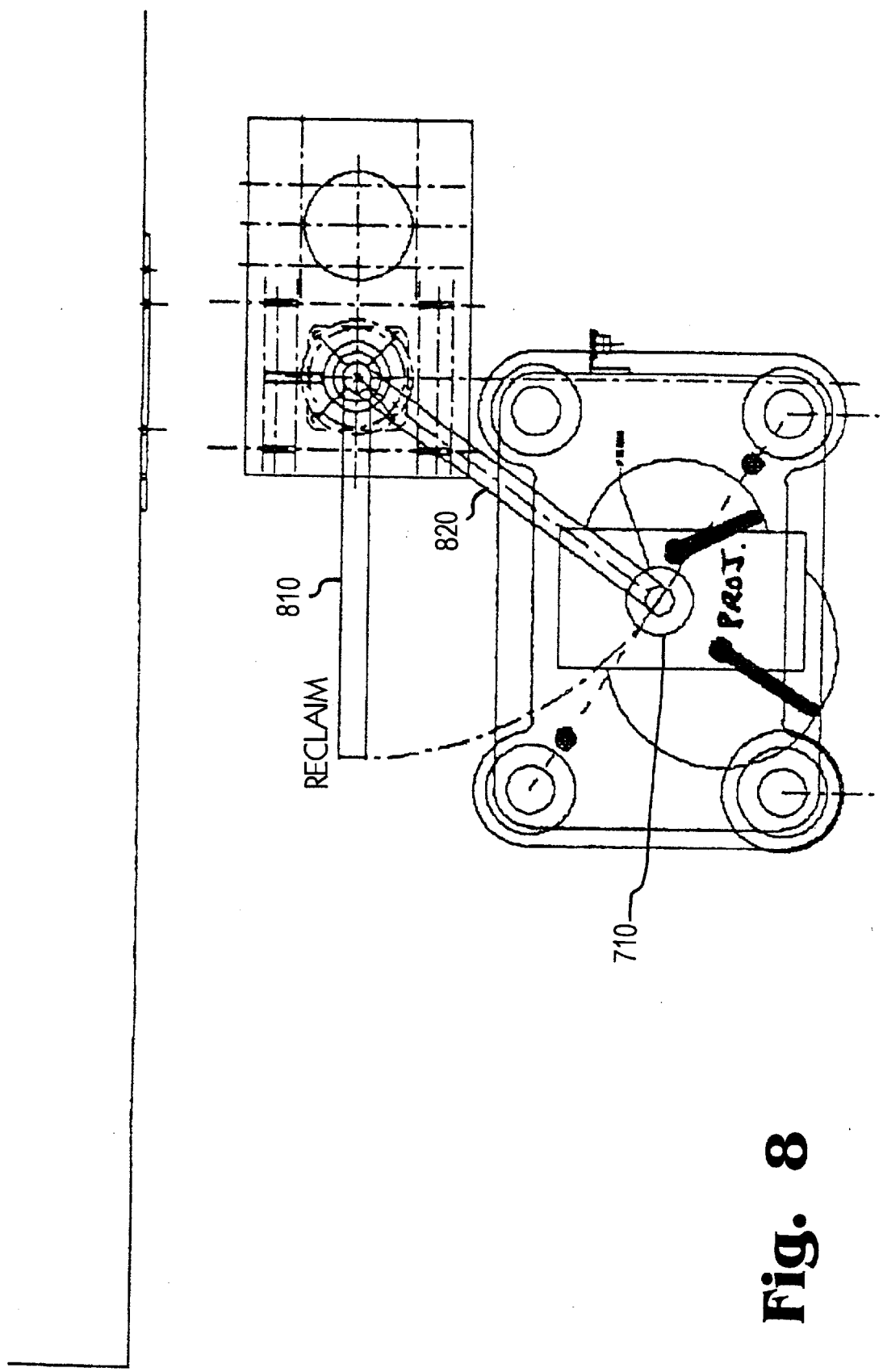
FIG. 8 is cross-sectional view through line VIII—VIII of FIG. 7B.

In FIG. 7B, press 740 of the present invention additionally has position sensor 750 and moveable powder chute 760. The operation of powder chute 760 may be seen in FIG. 8, in which the powder chute is illustrated in two positions, 810 and 820. Position 820 is above casing 710, and in this position, powder from the dump bucket is fed into the casing. Position 810 is a retracted position, and may be used for dumping powder to recycling in the event of an improper weight in the dump bucket. Likewise, the powder chute is retracted before pressing.

The operation of the apparatus of the present invention is controlled by a PLC, as noted above. FIG. 9 is a flowchart summarizing how increment target weight data are sent to the gravimetric powder feeder. When the PLC ladder logic decides to initiate a powder fill cycle (step 920), an interrupt will be transferred to the ABM (ASCII BASIC MODULE) from the PLC ladder logic (step 930). The ABM services the interrupt by GOSUBing to open port 1 and sends a series of setup strings requesting comm type, scale range and tolerance to the feeder via the RS232 interface (step 940). The ABM then sends a target weight string appropriate for the number of the increment to the feeder via the same RS232 interface (step 950). The ABM closes port 1, and transfers a digital feeder parameter sent signal to the PLC ladder logic (step 960) and then the subroutine returns control back to the basic program running in the ABM to await other interrupts (step 970).

FIG. 10 illustrates how weight data are collected from the gravimetric feeder. When the gravimetric feeder has completed the delivery of the first weight increment into the dump bucket, the feeder will send a digital fill complete signal(OUT0) for 0.1 second to the PLC ladder logic (step 1020). The PLC ladder logic processes this digital signal which results in an interrupt to the ABM (step 1030). The ABM services the interrupt by GOSUBing to open port 1 and sends a request string to the feeder via the RS232 interface (step 1040). The feeder responds by sending a weight string back to the ABM through the same interface (step 1050). The ABM closes port 1 (step 1060), extracts the increment weight from the first weight string and transfers the floating point weight accurate to 0.1 g to the PLC ladder logic memory first increment weight location (step 1070). Then the subroutine returns control back to the basic program running in the ABM to await other interrupts (step 1080). When the gravimetric feeder has completed the delivery of subsequent weight increments into the dump bucket, the feeder will send a digital fill complete signal (OUT0) for 0.1 second to the PLC ladder logic. The PLC ladder logic processes this digital signal as above, except that the floating point weight is transferred to the ladder logic memory corresponding increment weight location.

A BASIC program written to interface the gravimetric feeder to the PLC is given in Appendix A. A program giving the control logic of the apparatus is given in Appendix B.

Accordingly, the present invention provides a method and apparatus for providing zero-defect pressed articles with minimal, remote operator intervention. The invention provides for precise weighing of powder and avoids waste of powder in the event of improper powder dispensing. The invention provides for complete automatic logging of production and testing data, and rejection of defective articles, avoiding the need to manually test each produced article. This method and apparatus are particularly useful in the pressing of energetic materials, where manual operations are restricted for safety reasons.

What is claimed is:

1. A method of preparing pressed articles, comprising the steps of:

feeding powder to a bucket using a conveyor;

continuously weighing the bucket using an electronic scale;

determining if the weight of powder in the bucket is a desired weight;

when the weight of powder in the bucket is a desired weight, then dumping the powder in a bucket to a first location, and when the weight of powder in the bucket is an undesirable weight, dumping the powder to a second location;

conveying the powder from the first location to a press;

pressing the powder in the press and obtaining pressing parameter data;

conveying the pressed powder article from the press and controlling the steps of dumping, conveying and pressing of the powder; and storing said pressing parameter data.

2. The method of claim 1, further comprising the step of:

reclaiming the powder dumped to the second location.

3. The method of claim 2, said step of reclaiming the dumped powder further comprising conveying the powder to a hopper to be fed again to said bucket.

4. The method of claim 1, said first location being a shoe for transporting powder to a die cavity of the press.

5. The method of claim 1, said press being an opposed-ram press having an upper and a lower ram and cylinders.

6. The method of claim 5, said press being a hydraulic opposed-ram press.

7. The method of claim 5, said step of pressing further comprising:

placing the powder into a die cavity above the lower ram; and pressing the powder by lowering the upper ram into the die cavity.

8. The method of claim 7, said step of placing the powder further comprising:

moving the lower ram to an "up" position;

placing a die containing the powder over the lower ram; and lowering the lower ram to draw the powder into the die cavity.

9. The method of claim 8, said step of conveying the pressed powder article from the press further comprising:

displacing the pressed article from over the lower ram by said placing of the die.

10. The method of claim 1, said steps of dumping the powder to a first or second location further comprising:

moving the bottom end of moveable chute over the first or second location; and dumping the bucket into the top end of the chute.

11. The method of claim 1, further comprising the step of;

controlling, using a programmed logic controller, said steps of feeding powder, continuously weighing the bucket, determining if the weight is a desired weight, dumping the powder, conveying the powder to the press, pressing the powder, conveying the pressed article and storing the pressing parameter data.

12. The method of claim 11, said controlling step further comprising:

receiving analog input from the press electronic sensors.

13. The method of claim 12, said controlling step further comprising:

exchanging digital input/output with a dump controller for controlling the dump bucket, and with hydraulic solenoids in a power unit for operating the cylinders of the press.

14. The method of claim 13, said controlling step further comprising:

exchanging data with a feeder controller for controlling the feeding of the powder.

15. The method of claim 1, further comprising the step of:

labeling the pressed article for serial identification.

16. The method of claim 1, further comprising:

after conveying the pressed article from the press, inspecting the pressed article and storing the inspection data.

17. The method of claim 16, further comprising:

determining from said stored pressing parameter and inspection data if the pressed article is acceptable; and diverting an unacceptable article to a different location from acceptable articles.

18. The method of claim 1, further comprising:

after conveying the pressed article from the press, packaging the pressed article.

19. An apparatus for preparing pressed articles, comprising:

a press;

a powder feeding portion adjacent to the press, comprising:

a hopper for holding powder;

a powder feeder, for conveying powder from the hopper to a dump bucket;

a dump bucket;

an electronic scale connected to the dump bucket, for weighing the dump bucket;

means for dumping the powder in the dump bucket when a desired weight of the dump bucket is measured by the scale;

means for diverting the dumped powder to a first location when the weight of the dump bucket is a desired weight or second location when the weight of the dump bucket is an undesired weight; and means for conveying powder from the first location to the press;

a controller connected to the press and the powder feeding portion, for controlling the press, the powder feeder, the means for dumping, the means for diverting and the means for conveying.

20. The apparatus of claim 19, said means for diverting the dumped powder comprising a directional diverter.

21. The apparatus of claim 19, said means for diverting the dumped powder comprising a moveable chute.

22. The apparatus of claim 21, further comprising:

a computer connected to the controller for logging data.

23. The apparatus of claim 21, further comprising;

process electrical sensors in the press; and said controller further comprising an analog input/output connected to said process electrical sensors.

24. The apparatus of claim 21, further comprising:

pneumatic controls for controlling said press; and said means for controlling the dump bucket comprising a dump controller connected to the dump; and said controller comprising digital input/output connected to said pneumatic controls and said dump controller.

25. The apparatus of claim 24, said controller further comprising:

a ladder logic controller portion for connecting to the computer.

26. The apparatus of claim 21, further comprising:

a feeder controller for controlling said powder feeder; and said controller further comprising basic logic connected to said feeder controller.

27. The apparatus of claim 26, further comprising:

blast doors for isolating the area containing the press and powder feeding portion;

door sensors and controls connected to the blast doors and to pneumatic controls for controlling the closing of the blast doors.

28. The apparatus of claim 21, further comprising:

a projectile scale, for weighing a projectile for loading with powder; and a scale controller connected to the projectile scale and to the controller.

29. The apparatus of claim 21, wherein said press comprises a hydraulic opposed-ram press.

30. The apparatus of claim 21, further comprising:

a shoe for receiving powder at the first location.

31. The apparatus of claim 21, further comprising:

a vacuum pump for evacuating the die cavity of the press.

32. The apparatus of claim 31, further comprising:

a height sensing gauge adjacent to the press, for measuring the height of a pressed article.

33. The apparatus of claim 21, further comprising:

means for conveying powder from said second location to said hopper of the powder feeding portion.

34. The apparatus of claim 33, said means for conveying powder from said second location being a conveyor belt or screw thread.

35. The apparatus of claim 21, further comprising:

means for conveying a pressed article from the press.

36. The apparatus of claim 35, further comprising:

labeling means for labeling pressed articles after pressing.

37. The apparatus of claim 36, further comprising:

inspecting means for inspecting pressed articles being conveyed by the conveying means; and controller means connected to the inspecting means and the means for diverting unacceptable articles, for controlling the diversion of unacceptable articles.

38. The apparatus of claim 21, said controller being a programmed logic circuit.

* * * * *